METHOD AND APPARATUS FOR WELL CONTROL

Original Filed Sept. 13, 1962 2 Sheets-Sheet 1

Louis R. Records
INVENTOR.

METHOD AND APPARATUS FOR WELL CONTROL

Original Filed Sept. 13, 1962 2 Sheets-Sheet 2

Louis R. Records
INVENTOR.

United States Patent Office

Re. 26,220
Reissued June 6, 1967

26,220

METHOD AND APPARATUS FOR WELL CONTROL

Louis R. Records, Lafayette, La., assignor, by mesne assignments, to Drilling Well Control, Inc., Houston, Tex., a corporation of Texas Original No. 3,213,939, dated Oct. 26, 1965, Ser. No. 223,459, Sept. 13, 1962. Application for reissue Apr. 4, 1966, Ser. No. 549,085
26 Claims. (Cl. 166—8)

Figure 1:
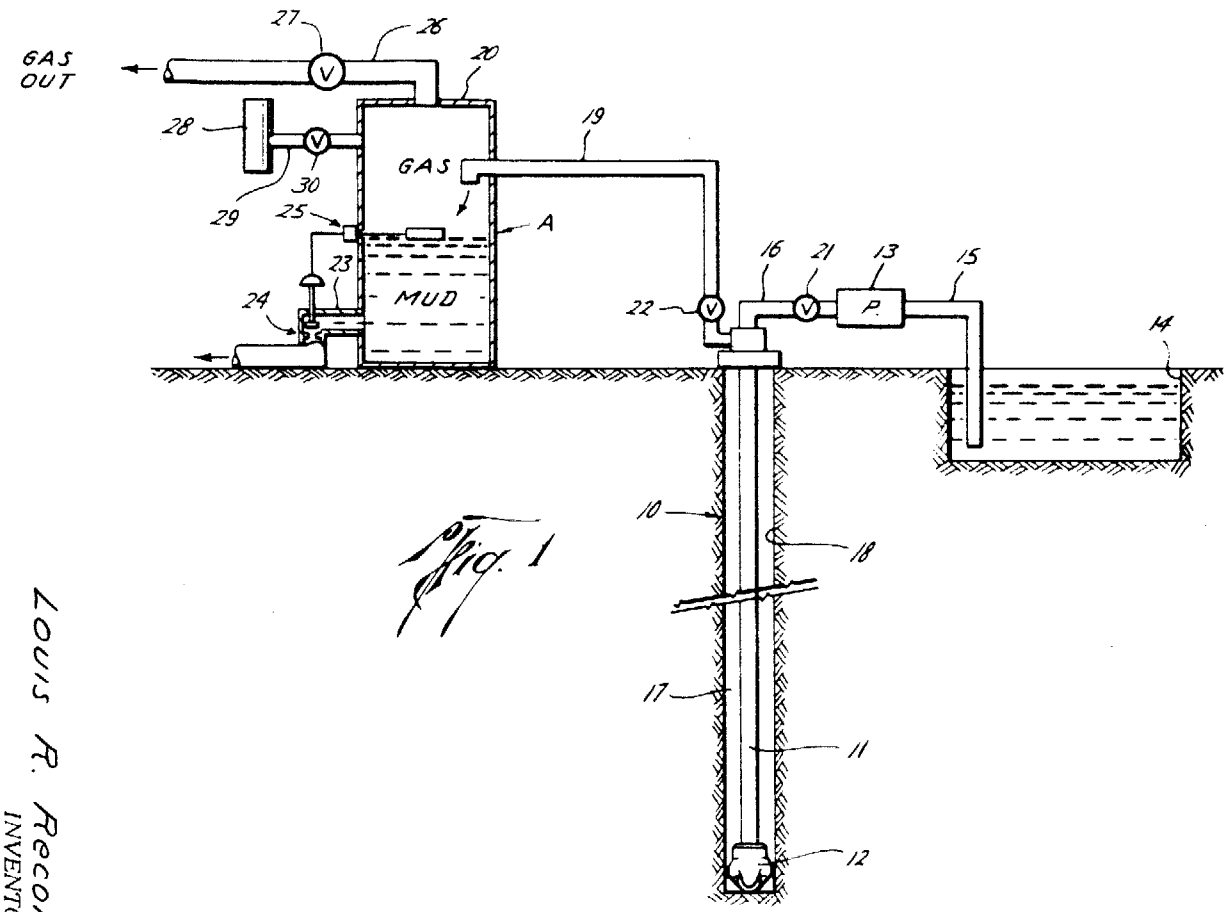

Matter enclosed in heavy brackets [ ] appears in the original patent but forms no part of this reissue specification; matter printed in italics indicates the additions made by reissue.

This invention relates to a method and apparatus for well control, and more particularly it relates to such a method and apparatus for maintaining control of a well during the drilling operation to prevent blowing out of the well.

It is customary during the drilling of a well to pump or circulate a drilling fluid, known in the art as "mud," downwardly through the drill pipe or stem to which the drill bit is attached and into the annulus formed by such *drill* stem and the wall of the well bore whereupon such mud is returned to the surface. There is thus created what might be termed a U-tube with the drill stem forming one leg of the U-tube and the annulus between the drill stem and the wall of the well bore forming the other leg.

The drilling fluid or "mud" functions, in effect, as a "stopper" in the well since it exerts a hydrostatic pressure on the bottom of the well according to the specific weight of the mud thereabove, and the hydrostatic pressure of each of the mud columns must balance or overcome the formation pressure in order to prevent "blowouts," that is, the blowing or forcing of the mud out of the well bore and the venting of the formation pressure to the atmosphere. However, the pressure of the formation adjacent the drill bit, or bottom-hole pressure, must also be considered because this pressure must sustain the hydrostatic pressure of the mud in order to prevent loss of circulation, that is, the loss of mud as it escapes into a formation due to the pressure exerted by the mud column. It is therefore desirable that the pressures in the well bore adjacent the drill bit remain in a more or less balanced condition.

However, as the drilling of the well progresses, the drill bit frequently passes through a formation or zone wherein the pressure is increased to such an extent that an unbalanced pressure condition in the well occurs. When such an unbalanced pressure condition exists in the well, there is created the danger of a blowout unless the increased pressure is balanced or overcome and control of the well is maintained. The material in the high pressure formation, which is usually gas, oil, salt water, or the like, escapes from the formation under the increased pressure into the well bore thereby reducing the specific weight of the mud therein, and increasing the danger of a blowout. Also, if gas escapes from a high pressure formation, it becomes entrained in the mud stream and tends to expand as it travels out of the well and passes through a flow device, such as a throttling valve or choke, thereby increasing the abrasive action of the mud stream and subjecting the flow device to excessive wear.

It has been the practice in the past, when blowout conditions are encountered, to "slug" the well, that is, a mud having a weight greater than that of the inadequate mud already present in the well is pumped into the well in an attempt to prevent the blowout and maintain control of the well. This procedure is not satisfactory since the well is not controlled during the "slugging" operation and the blowout may occur before the adequate or proper mud is circulated into the well and it is brought under control again. Another disadvantage of this practice is that the well may be over-pressured by the heavy mud column with the resulting loss of circulation.

It is, therefore, an object of this invention to provide a method and apparatus for conveniently restoring and maintaining the balanced pressure conditions which are necessary to maintain the well under control during the drilling operation.

It is another object of this invention to provide a method and apparatus which involves maintaining a desired back pressure on the drilling fluid or "mud" by means of a controlled gas pressure, which pressure together with the column of otherwise inadequate drilling fluid, will assure that a blowout is prevented.

It is another object of this invention to provide a method for controlling a well during actual or threatened blowout conditions by applying a controlled back pressure to the drilling mud so that said pressure plus the hydrostatic pressure of the mud is sufficient to prevent a blowout, after which mud of proper weight is added to bring the well back into the desired pressure balance, said back pressure being gradually reduced as mud of the desired weight is added and balanced pressure conditions in the well are restored.

Another object of this invention is to provide an apparatus for continuously removing the gas entrained in the drilling mud while continuously circulating said mud whereby the abrasive action of the mud is materially reduced and yet there is little or no settling out of the materials or "cuttings" contained within such mud.

Still another object of this invention is to provide an apparatus for separating or removing the gas entrained in the mud before such mud is passed through a flow device, such as a valve or choke, thereby substantially removing the abrasive action of the mud as it passes through such flow device.

A further object of this invention is to provide a method and apparatus of the character described wherein the mud is passed through a first gas separating unit and may thereafter be subjected to subsequent stage separation under reduced pressure conditions to assure complete separation or removal of the gas from the mud.

Yet another object of this invention is to provide an apparatus of the character described which may be initially charged with a gas, such as nitrogen, to the desired back pressure for maintaining control of the well.

The construction designed to carry out the invention will be hereinafter described, together with other features thereof.

Figure 2:
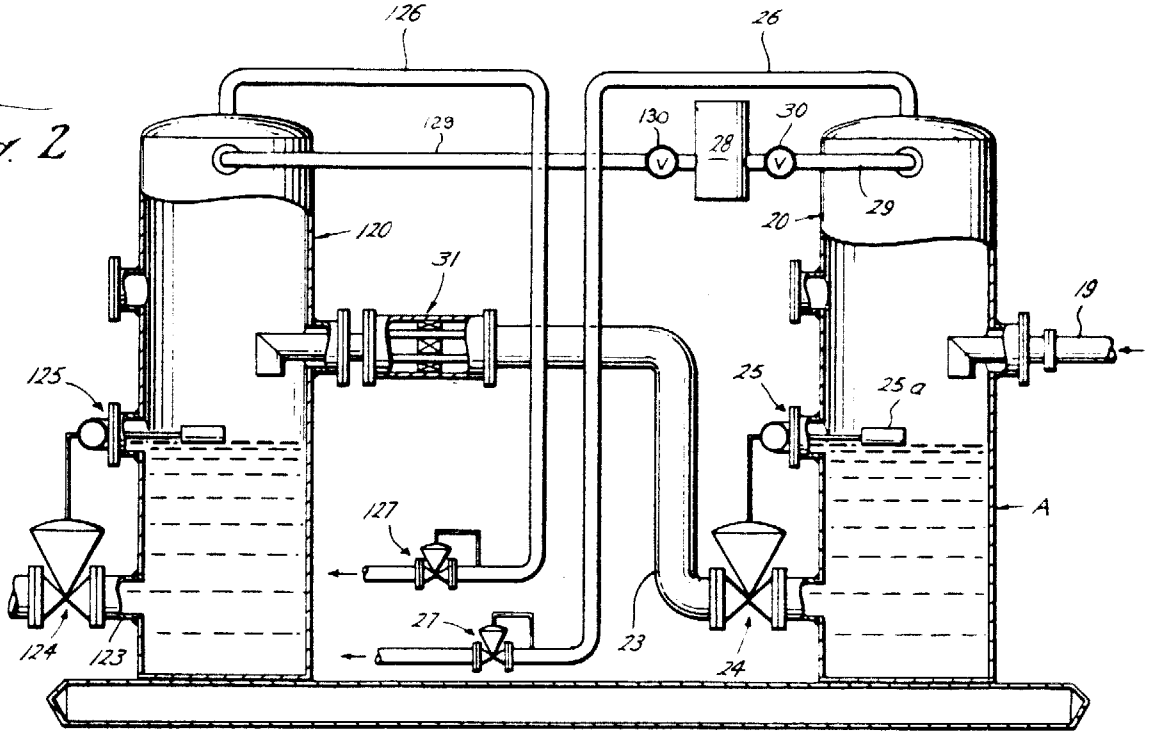

This invention will be readily understood from a reading of the following detailed description and reference to the drawings wherein:

FIGURE 1 is a diagrammatic illustration of a well connected to or with an apparatus for maintaining a desired back pressure on said well and for removing entrained gas from the drilling fluid, and FIGURE 2 is an elevation view, partly in section, diagrammatically illustrating such an apparatus together with a second similar apparatus for removing gas from the mud stream under reduced pressure conditions.

In the drawings, the numeral 10 designates a well bore having the usual drill pipe or string 11 disposed therein. The drill string 11 is suspended from the surface of the well by the well-known drilling rig (not shown). The drill bit 12 is attached to the bottom end of the drill pipe 11 in the usual manner.

A pump 13 draws the drilling fluid or "mud" from a suitable storage vessel or pit 14 through the conduit 15 and pumps it into the discharge line 16 which communicates with the drill pipe 11. The mud passes downwardly through the drill pipe 11, outwardly through the drill bit 12 and into the annulus 17 formed between the exterior of the drill pipe 11 and the wall 18 of the well 10. A suitable conduit 19 communicates with the upper end of the annulus 17 below the conventional blowout preventer enclosed within and forming a part of the casinghead and provided for packing off the annulus space around the drill pipe 11 in the event of threatened blowout. The conduit 19 constitutes an outflow line for returning drilling mud and any entrained well fluid and discharges into the apparatus A which functions to maintain a desired back pressure against the drilling fluid in the annulus 17. As will be more fully explained, the apparatus A also provides a means for removing entrained gas, if any, from the mud. Suitable valves 21 and 22 are disposed within the lines 16 and 19, respectively, so that the well may be "shut in" by closing said valves.

The apparatus A includes a vessel 20 having a mud discharge line 23 communicating with the lower portion of such vessel, and a flow control valve 24 is provided in the line 23 to control the flow of mud therethrough. The opening or flow passage through the valve 24 is controlled by a liquid level control means 25, such as a float 25a actuating a pneumatic system for opening or closing the valve 24 according to the level of the mud within the vessel 20. It is thus apparent that the level of the mud within the vessel 20 is maintained at a more or less constant level or within certain limits depending upon the adjustment and operation of the particular liquid level control means employed. The mud discharging through the line 23 and valve 24 is ordinarily conveyed to the pit 14 or some other suitable storage vessel. As will be more fully described hereinafter, the mud may be subjected to subsequent stage or low pressure gas separation.

A gas discharge line 26 communicates with the gas space in the upper portion of the vessel 20 above the level of the mud. A means for maintaining a back pressure such as the valve 27, is provided in the gas line 26 so that a desired back pressure may be maintained on the vessel 20, line 19 and annulus 17. Such a back pressure is maintained by the valve 27 by permitting a certain amount of the gas to escape or vent from the interior of the vessel 20, and the back pressure thus established may be varied by varying the opening through the valve 27 or the time during which it stays open. The gas which is entrained in the mud escapes therefrom into the gas space and gas discharge line 26 wherein it may be conveyed a safe distance from the well and flared. It is to be noted that the mud discharge valve 24 cooperates or coacts with the gas discharge valve 27 in maintaining the back pressure; however, it is preferable to establish a more or less constant mud level within the vessel 20 and adjust and maintain the desired back pressure by means of the gas valve 27.

There is also provided a means for charging the vessel to the desired back pressure, and this means preferably includes a storage vessel 28 for storing the charging gas, such as nitrogen, and a line 29 communicating between the storage vessel 28 and the gas space within the vessel 20. A valve 30 is provided in the line 29 so that the connection between the storage vessel 28 and the vessel 20 may be broken or shut off when the desired pressure is reached in the vessel 20. By providing a suitable pressure responsive valve in lieu of the valve 30 in the line 29, the pressure charging means may also function to make up any sudden pressure loss in the vessel 20 below the desired pressure.

It is noted that the apparatus A need not be connected to the well at all times during the drilling operation, but it may be held readily available on a standby basis so that it may be connected to the well in the manner described when desired.

In the use of the apparatus or system which provides a method of sequential steps for properly maintaining control of the well and thereby preventing a blowout, the apparatus does not function during normal drilling operations at which time the valves 21 and 22 are open to permit normal circulation of the drilling fluid in the well-known manner. However, when blowout conditions are encountered during the drilling operation, it is preferable to first shut in the well by closing the valves 21 and 22 so that the well is contained and the immediate danger of a blowout is eliminated. The apparatus A may then be connected to the well and charged to the desired back pressure to balance or overcome the increased pressure in the well. Thereafter, the valves 21 and 22 are opened and drilling fluid of the desired specific weight is pumped into the drill stem 11 while the desired back pressure is maintained on the annulus 17 to prevent a blowout through such annulus. As the desired mud is pumped into the drill pipe 11, it displaces the mud in the drill pipe 11 and annulus 17; such mud being discharged through the line 19 into the vessel 20. It is thus apparent that the well is maintained under control at all times through the readily controllable back pressure applied to the well, and it is not necessary to "slug" the well with a heavy mud since the desired mud may be circulated into the well at the desired rate without any danger of overpressuring the well.

If salt water has been forced into the mud by the increased formation pressure, then the mixture of mud and salt water simply passes through the apparatus A while such apparatus maintains the desired back pressure on the annulus 17. However, if gas has been forced into the mud by the increased formation pressure, then substantially all this entrained gas is separated from the mud stream in the vessel 20 and escapes through the gas discharge line 26 and the back pressure valve 27. The gas separated or released from the mud stream displaces the initial charging gas, such as nitrogen, so that the separated gas is utilized for maintaining the desired back pressure on the well.

The mud discharging from the vessel 20 through the line 23 and mud discharge valve 24 is substantially gas-free and the valve 24 is therefore subjected to less abrasion and wear than it would be had the entrained gas not been removed from the mud. It is noted that the mud passes through the vessel 20 in a substantially continuous manner so that there is little or no time in which the materials carried by or suspended in the mud, such as cutting or lost circulation material, may settle out.

The pumping of the desired mud into the drill pipe 11 is continued until there is a column of mud of the desired specific weight within the drill pipe sufficient to create a hydrostatic pressure to balance or overcome the increased formation pressure. Thereafter, continued pumping forces the mud of the desired specific weight into the annulus 17. As the hydrostatic pressure created by the mud column in the annulus 17 increases, the back pressure maintained on such annulus by the apparatus A is reduced so that the formation pressure is contained and the well is under control at all times, and yet the danger of loss of circulation is reduced or eliminated. Circulation of the desired mud into the annulus is continued until there is established therein a column of mud which exerts a hydrostatic pressure sufficient to balance or overcome the formation pressure and the need for the back pressure no longer exists. Thus, the balanced pressure condition in the well is restored so that the danger of a blowout is eliminated, and the drilling operation may proceed.

In summary, a back pressure is applied to the well by imposing such back pressure on what might be termed the annulus leg of a U-tube so that a blowout therethrough is prevented. Thereafter, a hydrostatic pressure sufficient to contain the increased formation of pressure is created by a column of mud of the desired specific weight in the drill pipe leg of the U-tube so that a blowout may not occur therethrough. Continued pumping of such mud will circulate it into the annulus leg so that a similar hydrostatic pressure is created therein as the back pressure is reduced so that a blowout through the annulus leg is prevented. Balanced pressure conditions are maintained in the well at all times so that the danger of a blowout is eliminated, and yet it is not necessary to over-pressure or slug the well with an excesively heavy mud which may result in an undesirable loss of circulation.

As has been noted, it is frequently desirable to provide subsequent low pressure separation for removing whatever gas may remain in the mud after it has passed through the vessel 20, and a second or low pressure separator is illustrated in FIGURE 2. As shown in this figure, the apparatus A heretofore described, which functions as the first or high pressure separator is illustrated and the low pressure or second stage separator is connected in series therewith. The low pressure separator is similar to the apparatus A previously described in that it includes a vessel 120 having a gas discharge line 126 and back pressure valve 127, mud discharge line 123, and a mud discharge control valve 124 which is actuated by a liquid level control means 125 whereby the liquid level in the vessel is maintained more or less constant or within certain limits. A means for initially charging the second stage vessel 120 to a desired back pressure is also provided, and such means preferably includes a charging line 129 communicating with the storage vessel 28 and the vessel 120. A valve 130 is provided in the line 129 so that the vessel 120 may be isolated from the storage vessel 28 when the vessel 120 is charged to the desired back pressure.

The mud discharge line 23 from the first or high pressure vessel 20 communicates with the gas space in the vessel 120 above the liquid level line. A pressure-reducing means 31 is disposed in the mud line 23 so that the pressure in such line and the vessel 120 may be reduced to the desired pressure. This pressure-reducing means 31 is preferably a multiple choke device so that the pressure may be reduced the desired degree without an excessive increase in the velocity of the mud stream. It is noted that the pressure-reducing means 31 need not reduce the pressure of the mud stream to atmospheric pressure since a further pressured drop may be taken across the vessel 120 before the mud is discharged through the line 123 into a storage vessel or pit.

The gas separated from the mud in the vessel 120 is conveyed therefrom through the line 126 and valve 127 whereupon it may be flared or otherwise disposed of at a safe distance from the well. The mud flows through the vessel 120 in substantially a continuous manner so that there is little or no settling out of the cuttings or lost circulation material from such mud stream. Since substantially all of the gas has been removed from the mud stream by the time it passes through the valve 124, there is little or no wearing of this valve due to the expansion of entrained gas escaping from the mud stream as it passes through such valve, and since the pressure in the line 23 between the vessels 20 and 120 is reduced by the pressure reducing means 31, there is little or no wearing of the mud control valve 24 due to the expansion of entrained gas as the mud stream passes therethrough.

The foregoing disclosure and description of the invention is illustrative and explanatory thereof, and various changes in the size, shape and materials, as well as in the details of the illustrated construction, may be made within the scope of the appended claims without departing from the spirit of the invention. As an example, and not by way of limitation, the various components may be piped or connected for "reverse circulation," that is, the conduit 19 which communicates with the vessel 20 would be connected to the drill pipe 11, and the pump discharge line 16 would communicate with the annulus 17 so that the normal circulation is reversed in that the pump 13 pumps the drilling fluid into the annulus 17 and thence outwardly through the drill pipe 11 and into the conduit 19 and vessel 20.

What I claim is:

1. A method for controlling a well being drilled and having drilling mud circulated therethrough, said method being carried out when pressure conditions which might cause a blowout are encountered, said method comprising, passing returning mud into a pressure vessel, introducing pressure gas into the vessel to charge the vessel to a pressure substantially in balance with well pressure and thereby exerting back pressure against the drilling mud within the well, said back pressure together with the hydrostatic pressure created by said drilling mud being of sufficient magnitude to maintain the well under control, pumping drilling mud of the desired weight into the well to increase the weight of the drilling mud and hydrostatic pressure created thereby, varying gas pressure within the vessel to control said back pressure in relationship to the hydrostatic pressure created by the drilling mud being pumped into the well whereby the hydrostatic pressure of the drilling mud column together with said back pressure are sufficient to maintain the well under control during the pumping of said drilling mud, and discontinuing said introduction of pressure gas into said vessel when the hydrostatic pressure created by the column of drilling mud of increased weight is sufficient to again maintain the well under control.

2. A method for controlling a well being drilled and having drilling mud circulated therethrough, said drilling fluid having gas entrained therein, said method being carried out when pressure conditions which might cause a blowout are encountered, said method comprising, passing returning mud into a pressure vessel, introducing pressure gas into the vessel to charge the vessel to a pressure substantially in balance with well pressure and thereby exerting back pressure against the drilling mud within the well, said back pressure together with the hydrostatic pressure created by said drilling mud being of sufficient magnitude to maintain the well under control, pumping drilling mud of the desired weight into the well to increase the weight of the drilling mud and hydrostatic pressure created thereby, varying said back pressure in relationship to the hydrostatic pressure created by the drilling mud being pumped into the well whereby the hydrostatic pressure of the drilling mud column together with said back pressure are sufficient to maintain the well under control during the pumping of said drilling mud, continuously removing substantially all of the entrained gas in the drilling mud from said mud as it passes under pressure through said vessel, and discontinuing said introduction of pressure gas into the vessel when the hydrostatic pressure created by the column of drilling mud of increased weight is sufficient to again maintain the well under control.

3. A method for controlling a well being drilled and having a hollow drill pipe and an annulus surrounding the drill pipe, one of the pipes and the annulus affording a flow conduit for mud delivered by a pump and the other thereof affording a flow conduit for mud returning to an open pit, said method being carried out when pressure conditions which might cause a blowout are encountered, said method comprising, passing returning mud into a separator upstream of the open pit, introducing gas under pressure into the separator for application of back pressure against the drilling mud within the return flow conduit, said back pressure together with the hydrostatic pressure created by said drilling mud being of sufficient magnitude to maintain the well under control, pumping drilling mud of the desired weight into the mud delivery conduit to thereby increase the weight of the drilling mud and the hydrostatic pressure created thereby, varying said back pressure in relationship to the hydrostatic pressure created by the drilling mud being circulated into said mud delivery conduit whereby the hydrostatic pressure of the drilling mud column therein together with back pressure are sufficient to maintain the well under control during the pumping of said drilling mud, and discontinuing said introduction of pressure gas into the separator when the hydrostatic pressure created by the column of drilling mud of increased weight in the well is sufficient to again maintain the well under control.

4. A method for controlling a well being drilled and having drilling mud circulated therein, said method being carried out when pressure conditions which might cause a blowout are encountered, said method comprising, passing mud returning toward an open storage pit first through a pressure vessel upstream of the open pit, introducing pressure gas into the vessel for application of back pressure against the drilling mud contained within the annulus formed by the exterior of the drill pipe and the bore of the well, said back pressure together with the hydrostatic pressure created by said drilling mud being of sufficient magnitude to maintain the well under control and prevent a blowout through said annulus, pumping drilling mud of the desired weight into the drill pipe to increase the weight of the drilling mud contained therein and the hydrostatic pressure created thereby, varying said back pressure in relationship to the hydrostatic pressure created by the drilling mud being circulated into said annulus whereby the hydrostatic pressure of the drilling mud column in said annulus together with said back pressure are sufficient to maintain the well under control during the pumping of said drilling mud and to prevent a blowout through said annulus, and discontinuing said introduction of pressure gas into the vessel when the hydrostatic pressure created by the column of drilling mud of increased weight in said annulus is sufficient to again maintain the well under control and prevent a blowout through said annulus.

5. A method for controlling a well being drilled and having drilling fluid therein, said method being carried out when pressure conditions which might cause a blowout are encountered, said method comprising, initially charging a liquid gas separator with pressure gas to a controlled pressure level, placing said gas pressurized separator into communication with the well outflow pipe for application of back pressure against the drilling fluid within the well, said back pressure together with the hydrostatic pressure created by said drilling fluid being of sufficient magnitude to maintain the well under control, pumping drilling fluid of the desired weight into the well to increase the weight of the drilling fluid and hydrostatic pressure created thereby, adjusting gas pressure level within the separator for varying said back pressure in relationship to the hydrostatic pressure created by the drilling fluid being pumped into the well whereby the hydrostatic pressure of the drilling fluid column together with said back pressure are sufficient to maintain the well under control during the pumping of said drilling fluid, and reducing the pressure level within the separator and the application of said back pressure when the hydrostatic pressure created by the column of drilling fluid is sufficient to again maintain the well under control.

6. A method for controlling a well as set forth in claim 5 together with, first shutting in the well so that the well is contained in the interval required for mechanically connecting the separator to said well.

7. A method for controlling a well being drilled and having drilling fluid therein, said drilling fluid having gas entrained therein, said method being carried out when pressure conditions which might cause a blowout are encountered, said method comprising, initially charging a liquid gas separator with pressure gas to a controlled pressure level, placing said gas pressure separator into communication with the well outflow pipe for application of back pressure against the drilling fluid within the well, said back pressure together with the hydrostatic pressure created by said drilling fluid being of sufficient magnitude to maintain the well under control, pumping drilling fluid of the desired weight into the well to increase the weight of the drilling fluid and hydrostatic pressure created thereby, adjusting gas pressure level within the separator for varying said back pressure in relationship to the hydrostatic pressure created by the drilling fluid being pumped into the well whereby the hydrostatic pressure of the drilling fluid column together with said back pressure are sufficient to maintain the well under control during the pumping of said drilling fluid, continuously separating the gas entrained in said drilling fluid upon entrance thereof into the liquid gas separator, utilizing said separated gas for maintaining said back pressure, and reducing the pressure level within the separator and the application of said back pressure when the hydrostatic pressure created by the column of drilling fluid is sufficient to again maintain the well under control.

8. An apparatus for controlling a well having drilling fluid therein comprising, a liquid gas separating vessel having an inlet line connecting said vessel to said well for conveying the drilling fluid from the well into said vessel, a liquid outlet line communicating with the interior of said vessel for removing said drilling fluid from said vessel, means coacting with said liquid outlet line for maintaining given limits of liquid level in said vessel above said liquid outlet line whereby a gas space is formed above said liquid level, a gas outlet line communicating with said gas space within said vessel for removing gas therefrom, pressure responsive valve means in said gas outlet line arranged to throttle said gas outlet line in response to selective pressure within said gas space for maintaining a back pressure on the interior of said vessel, and an outside source of pressure gas connected directly into said gas space for charging said vessel with gas to a predetermined pressure.

9. An apparatus for controlling a well having drilling fluid therein comprising, a first pressure vessel having an unrestricted inlet line connecting said vessel to said well for conveying the drilling fluid freely from the well into said vessel, a second pressure vessel having a liquid outlet line communicating with the interior of said second vessel for removing liquid from said second vessel, a conduit connecting the interior of said first vessel with the interior of said second vessel for transferring drilling fluid from said first vessel to said second vessel, flow pressure-reducing means forming part of said conduit whereby the pressure in said second vessel is maintained at a point considerably less than the pressure in said first vessel, means coacting with said conduit for maintaining a liquid level in said first vessel above the point at which said conduit communicates with said first vessel whereby a gas space is formed above said liquid level, a first gas outlet line communicating with said gas space within said first vessel for removing gas therefrom, means responsive to selected pressures within said first vessel and coacting with said first gas outlet line for maintaining a relatively high back pressure on the interior of said first vessel in excess of well pressure at said inlet.

means coacting with said liquid outlet line for maintaining a liquid level in said second vessel above the point at which said outlet line communicates with said second vessel whereby a gas space in formed above said liquid level, a second gas outlet line communicating with said gas space within said second vessel for removing gas therefrom, and means responsive to pressure within the second vessel and coacting with said second gas outlet line for maintaining a back pressure on the interior of said second vessel and at a level considerably less than said relatively high back pressure in said first vessel.

10. An apparatus for controlling a well as set forth in claim 9 together with, means for charging said first vessel with gas to a predetermined pressure and from a source other than the well to be controlled.

11. An apparatus for controlling a well as set forth in claim 9 together with, a source of pressure gas other than gas from the well and control means delivering pressure gas from said source selectively to said first vessel and to said second vessel and for charging the first vessel to a higher pressure than the pressure to which the second vessel is charged.

12. A method of controlling a well being drilled and of overcoming the disturbing effect on drilling mud pressures by incursion from earth formations such as might cause a blowout, said method comprising connecting the mud return line from the well with a liquid gas separator unit having a level responsive valve in its liquid outlet and a variable valved gas outlet, restricting said gas outlet and directing pressure gas from a source outside the well and into the separator to charge the same to a pressure level for creating back pressure on the mud and of such magnitude which combined with hydrostatic pressure maintains the well under control, pumping mud of increased weight into the well, discontinuing the delivery into the separator and from said source as the hydrostatic pressure increases, then reducing the restriction of said gas outlet for reducing back pressure on the well until hydrostatic pressure alone is sufficient to maintain the well under control.

*13. The method of controlling pressure in a well bore having a drill string and drilling fluid therein, comprising the steps of:*

*flowing drilling fluid returning from said well bore into a chamber in closed communication with said well bore;*

*and, selectively flowing another fluid directly into said chamber under a pressure of predetermined magnitude to impose a predetermined back-pressure on said returning drilling fluid.*

*14. The method of controlling pressure in a well bore having a drill string and drilling fluid therein, comprising the steps of:*

*passing drilling fluid returning from said well bore through a first portion of a chamber connected in closed communication with said well bore;*

*and, selectively introducing and withdrawing another fluid directly into and from a second portion of said chamber to impose a predetermined back pressure on said returning drilling fluid.*

*15. The method of controlling pressure in a well bore having a drill string and drilling fluid therein, comprising the steps of:*

*passing drilling fluid returning from said well bore through a chamber connected in closed communication with said well bore;*

*selectively introducing and withdrawing another fluid directly into and from said chamber to impose a predetermined back-pressure on said returning drilling fluid;*

*and, confining said drilling fluid in one portion of said chamber and said other fluid in another portion of said chamber.*

*16. The method of controlling pressure conditions in a well having a drill string and drilling fluid therein comprising the steps of:*

*flowing drilling fluid into the well and then through a chamber connected in fluid-tight communication with said well;*

*exerting back pressure against the drilling fluid in the well independently of variations in flow rate of said drilling fluid by selectively introducing another fluid directly into said chamber, with the pressure level of said other fluid selected such that the back pressure plus hydrostatic head pressure in the well is sufficient to keep the well under control.*

*17. The method for controlling pressure conditions in a well having a drill string and drilling fluid therein, comprising the steps of:*

*passing drilling fluid returning from said well through a chamber connected in closed communication with said well;*

*exerting back pressure against the drilling fluid in the well by selectively introducing and withdrawing a pressurized second fluid directly into and from a portion of said chamber while passing the drilling fluid therethrough, with the pressure level of said second fluid selected such that the back pressure plus hydrostatic head pressure in the well is sufficient to keep the well under control;*

*introducing a drilling fluid having a different specific gravity into the well when formation pressures in the well change;*

*and, varying the pressure level of said pressurized fluid to vary said back pressure to compensate for said changes in head pressure and formation pressure.*

*18. The method of controlling pressure conditions in a well having a drill string and drilling mud therein comprising the steps of:*

*passing drilling mud into the well and then through a chamber connected in fluid-tight communication with said well;*

*exerting back pressure against the drilling mud in the well by selectively introducing a pressurized fluid directly into a portion of said chamber while passing the drilling mud therethrough, with the pressure level of said pressurized fluid selected such that the back pressure plus hydrostatic head pressure in the well is sufficient to keep the well under control;*

*increasing the specific gravity of the drilling mud being introduced into the well when formation pressure increases to thereby increase the hydrostatic head pressure in the well;*

*and, varying the pressure level of said pressurized fluid to thereby vary said back pressure to compensate for said changes in head pressure and formation pressure.*

*19. The method of controlling pressure conditions in a well having a drill string and drilling mud therein during drilling operations, comprising the steps of:*

*passing drilling mud into the well and then through a first portion of a chamber connected in fluid-tight communication with said well;*

*exerting back pressure against the drilling mud in the well independently of variations in flow rate of said drilling mud by electively introducing a pressurized fluid directly into another portion of chamber, with the pressure level of said pressurized fluid selected such that the back pressure exerted thereby plus hydrostatic head pressure in the well is sufficient to keep the well under control;*

*introducing a drilling mud having a different composition into the well when well conditions change;*

*and, varying the pressure level of said pressurized fluid to vary said back pressure to compensate for changes in head pressure and formation pressure.*

*20. An apparatus for controlling pressure in a well bore having a drill string and drilling fluid therein, the combination of:*

*a chamber having inlet and outlet means;*

*means for delivering drilling fluid returning from said well bore into said chamber;*

*means containing a pressurized source of another fluid;*

*and, means for selectively delivering said other fluid directly into said chamber and generating a back pressure on said returning drilling fluid.*

*21. An apparatus for controlling pressure in a well bore having a drill string and drilling fluid therein, comprising:*

*a generally cylindrical member forming a chamber therewithin having inlet and outlet means;*

*means containing a pressurized source of another fluid;*

*ing drilling fluid under pressure into said chamber;*

*means containing a pressurized source of another fluid;*

*and, means for selectively delivering said other pressurized fluid directly into said chamber and thereby generating a back pressure on said returning drilling fluid.*

*22. An apparatus for controlling pressure conditions in a well bore having a drill string and drilling fluid therein, comprising:*

*a generally cylindrical member forming a chamber therewithin;*

*said member having first inlet means connected with said well for passing returned drilling fluid under pressure into said chamber;*

*said member having outlet means for discharging drilling fluid therefrom;*

*means cooperative with said outlet means for controlling the quantity of drilling fluid in said chamber;*

*means containing a pressurized source of another fluid;*

*said member having second inlet means;*

*and, means connected to said second inlet means for introducing said other fluid directly into said chamber, to thereby exert a back pressure on the drilling fluid in the well.*

*23. The apparatus as claimed in claim 22 including:*

*means for varying the pressure level of said pressurized second fluid, to thereby vary the amount of back pressure applied to said drilling fluid independent of drilling fluid circulating rate.*

*24. An apparatus for controlling pressure in a well bore having a drill string and drilling mud therein, comprising:*

*a vessel forming a chamber therewithin;*

*said vessel having first inlet means connected with said well for receiving thereinto drilling mud returned from the well under pressure;*

*said vessel having first outlet means for discharging drilling mud therefrom;*

*means cooperative with said first outlet means for controlling the quantity of drilling mud in said chamber;*

*means containing a pressurized source of another fluid;*

*said vessel having second inlet and outlet means;*

*and, means connected to said second inlet and outlet means for selectively introducing said other fluid directly into said chamber to impose a predetermined back pressure on said returning drilling mud.*

*25. The apparatus as claimed in claim 24 including:*

*means for varying the pressure level of said pressurized fluid, to thereby vary the amount of back pressure applied to said drilling mud independent of the flow rate thereof.*

*26. A system for controlling pressure in a well having a drill string and drilling mud therein, comprising:*

*an enclosed vessel defining a chamber therewithin;*

*first inlet means connected with said well for receiving into said chamber drilling mud returned from said well under pressure;*

*first outlet means communicating with said chamber for discharging drilling mud therefrom;*

*movable means supported in said chamber and cooperative with said first outlet means for controlling the rate of discharge of drilling mud from said chamber;*

*second inlet and outlet means communicating with said chamber;*

*means containing a pressurized source of another fluid; and*

*means connected to said second inlet and outlet means for selectively introducing said other fluid directly into said chamber and for varying the pressure of said fluid to impose a predetermined back pressure on said returning drilling mud which back pressure is independent of mud flow rate.*

References Cited

The following references, cited by the Examiner, are of record in the patented file of this patent or the original patent.

UNITED STATES PATENTS

| | | | |
|---|---|---|---|
| 399,427 | 3/1889 | Moore | 55—169 |
| 1,938,019 | 12/1933 | Hild | 175—25 |
| 2,082,329 | 6/1937 | Foran et al. | 175—205 |
| 2,763,281 | 9/1956 | Morgan | 137—209 |
| 2,786,652 | 3/1957 | Wells | 175—25 |
| 2,909,187 | 10/1959 | Gillooly | 137—209 |
| 3,070,935 | 1/1963 | De Leon | 55—170 |

OTHER REFERENCES

Bell: High-Pressure Drilling and Blowout Prevention, The Oil and Gas Journal, Oct. 14, 1957, pages 138–166.

CHARLES E. O'CONNELL, *Primary Examiner.*

JAMES A. LEPPINK, *Examiner.*